Patented June 16, 1931

1,810,518

UNITED STATES PATENT OFFICE

WILLIAM O. FROHRING, OF CLEVELAND, OHIO, ASSIGNOR, BY MESNE ASSIGNMENTS, TO THE TELLING BELLE VERNON COMPANY, OF CLEVELAND, OHIO, A CORPORATION OF OHIO

PROCESS OF MAKING LIQUID MALTED MILK

No Drawing. Application filed September 16, 1925. Serial No. 56,742.

My invention relates to improvement in the process of making liquid malted milk.

One object of my invention is the production of a liquid malted milk which can be kept for an indefinite period without deteriorating and which will readily mix with milk, water or other substances. This liquid malted milk is produced without the necessity of producing or utilizing malted milk in dried or powdered form.

Heretofore in order to prepare a malted milk either at home or at a soda fountain it has been customary to use some form of mechanical mixer to cause the dry malted milk to thoroughly mix with other substances. Ordinary dry malted milk when exposed to dampness becomes caked and unfit for use.

My product being in a liquid form can be quickly and conveniently mixed with other ingredients by simply shaking or stirring.

In order to carry out my invention, I first mix flour and water after which it is brought to a boiling point to swell the starch. After this is accomplished malted enzyme is added and heated to 150 degrees for about one hour until the starch is malted and gives no blue re-action to iodin.

The mixture is then condensed to increase the concentration, after which milk and any flavoring substance, such as chocolate, may be added; the entire mixture then is homogenized.

The mixture is finally placed in hermetically sealed cans and sterilized in order to kill the enzyme by submitting to a heat of 240 degrees for about fifteen minutes.

This last step or sterilization in addition to killing the enzyme enhances the flavor of the malt and the product can be kept indefinitely.

Before sterilizing, milk solids, in the form of fresh condensed milk are added to increase the food value and to increase its viscosity. This addition, however, while not a necessary step in the production of the liquid malted milk, serves the purpose specified.

In the foregoing it will be noted that dry malted milk is not utilized and that the resulting product produced by the foregoing process is a liquid malted milk which will keep indefinitely and readily lend itself for mixture with other ingredients.

Having thus described my invention what I desire to secure by Letters Patent is:

1. The process of making a non-perishable and palatable liquid malted milk, consisting in boiling a mixture of flour and water to swell the starch, adding an enzyme, heating until the starch is malted, condensing the malted flour solution to more concentrated liquid form, both the heating and condensing steps being performed at a temperature below boiling to avoid imparting a cooked flavor to the liquid material, adding milk, homogenizing the liquid mixture, hermetically sealing the mixture while still in liquid form in containers, and heating said containers and the liquid mixture therein to a temperature above boiling to sterilize the product and kill the enzyme, thereby producing a permanent, non-perishable liquid product having no cooked flavor and ready for immediate service upon opening the container.

2. The process of making a non-perishable and palatable liquid malted milk, consisting in boiling a mixture of flour and water to swell the starch, adding an enzyme, heating until the starch is malted, condensing the malted flour solution to more concentrated liquid form, both the heating and condensing steps being performed at a temperature below boiling to avoid imparting a cooked flavor to the liquid material, adding milk and flavoring material, homogenizing the mixture to thereby thoroughly disseminate the flavoring material through the liquid, hermetically sealing the mixture while still in liquid form in containers, and heating said containers and the liquid mixture therein to a temperature above boiling to sterilize the product and kill the enzyme, thereby producing a permanent, non-perishable liquid product having no cooked flavor and ready for immediate service upon opening the container.

In testimony whereof I affix my signature.

WILLIAM O. FROHRING.